(No Model.)
C. SORLEY & J. K. PUMPELLY.
METHOD OF FORMING STORAGE BATTERY PLATES.
No. 521,897. Patented June 26, 1894.
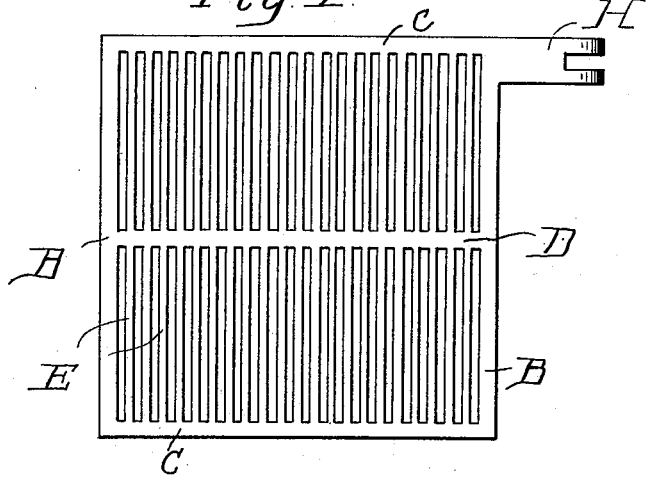
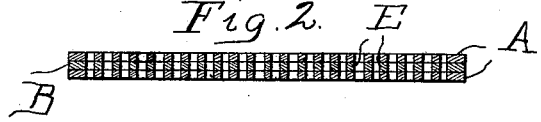
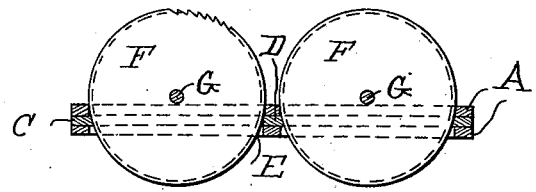

UNITED STATES PATENT OFFICE.

CHARLES SORLEY AND JAMES K. PUMPELLY, OF CHICAGO, ILLINOIS, ASSIGNORS TO THE PUMPELLY-SORLEY STORAGE BATTERY COMPANY, OF SAME PLACE.

METHOD OF FORMING STORAGE-BATTERY PLATES.

SPECIFICATION forming part of Letters Patent No. 521,897, dated June 26, 1894.

Application filed March 24, 1893. Serial No. 467,522. (No model.)

*To all whom it may concern:*

Be it known that we, CHARLES SORLEY, a subject of the Queen of Great Britain, and JAMES K. PUMPELLY, a citizen of the United States, residing at Chicago, Cook county, Illinois, have invented a new and useful Improvement in Storage-Battery Plates, of which the following is a specification.

Our invention relates to plates for storage batteries, and the method of their manufacture. It is illustrated in the accompanying drawings, wherein—

Figure 1 is a side view of such plate; Fig. 2, a cross section; and Fig. 3, a longitudinal section.

Like parts are indicated by the same letter in all the figures.

A A are clamping plates shaped substantially like the plate to be formed, but made of firm material, and adapted to hold the plate to be treated during the process of treatment.

B B are the side bars of the plate when formed; C C, the end bars; and D, the middle bar.

E E is a series of ribs formed by cutting out the metal between them.

F F are the circular saws, by which such metal is to be cut out; they are supported on the shafts or arbors G G, journaled in a suitable frame which is not here shown, as any convenient method for supporting saws may be adopted.

H is a laterally projecting lug or securing portion, whereby the plate may be attached to or associated with the plates in the series.

The use and operation of our invention are as follows: When storage or secondary battery plates are to be formed with grooves or slots thereon as indicated, or when they are to be built up so as to form a frame with a series of ribs there-across, various means are employed, and among others, that of building up the plate from strips of lead or metal. These several means and methods employed are more or less defective, and many of them involve a great deal of work, and are therefore expensive. In this method or means, which we herein illustrate, we take a plate of lead of the proper thickness for the ribs and frame, and securely clamp the same between the two forming or clamping plates. These plates are themselves ribbed as indicated, and in short, are practically duplicates of the plate to be formed. The parts thus brought firmly together are then suitably placed in any desired support, or on a table, and are brought against the saws, the gang of saws being moved on the plates as the case may be, and as may be found most convenient. The parts are finally brought to the position indicated in Fig. 2, when the saws will have cut out the metal, and left the ribs, so as to make the complete plate illustrated in Fig. 1.

We claim—

The method of forming a storage or secondary battery plate, which consists in clamping a sheet of lead between two plate forms, and then bringing the same against the gang of saws, which cut through the metal of the plate, thus leaving the plate of an integral piece, but with an outside frame, and a series of ribs there-across.

CHARLES SORLEY.
JAMES K. PUMPELLY.

Witnesses:
FRANCIS W. PARKER,
WALTER J. GUNTHORP.